UNITED STATES PATENT OFFICE.

RUDOLF DITMAR, OF GRATZ, AUSTRIA-HUNGARY, ASSIGNOR TO FARBENFABRIKEN VORM. FRIEDR. BAYER & CO., OF ELBERFELD, GERMANY, A CORPORATION OF GERMANY.

COLORED CAOUTCHOUC SUBSTANCES AND PROCESS OF MAKING SAME.

1,113,759.     Specification of Letters Patent.     Patented Oct. 13, 1914.

No Drawing.     Application filed October 31, 1912. Serial No. 728,836.

*To all whom it may concern:*

Be it known that I, RUDOLF DITMAR, doctor of philosophy, chemist, citizen of the Empire of Austria-Hungary, residing at Gratz, Austria-Hungary, have invented new and useful Improvements in Colored Caoutchouc Substances and Processes of Making Same, of which the following is a specification.

Colored caoutchouc has hitherto always been produced with mineral colors, such as cinnabar, antimony cinnabar, iron colors, etc., while of organic dyes only stearates of basic dyes or aluminium resinates of basic or acid dyes in solution in turpentine or similar liquids had been used for coloring the surface of thin sheets; but the results were unsatisfactory.

I have now found that organic vat coloring matters can be used for coloring caoutchouc and caoutchouc-like substances by mixing the caoutchouc and caoutchouc-like materials with the dye with or without the addition of a substratum and vulcanizing the colored caoutchoucs by heating with sulfur at the vulcanization temperature. It was highly surprising that the organic vat dyes could stand this process without injury to their valuable properties.

In order to illustrate the new process more fully the following example is given, the parts being by weight:—100 parts of hard rubber are mixed between rollers with 6 to 8 parts of thioindigo scarlet R and the mixture is vulcanized at 170° C. A beautiful bright violet pink ebonite is thus obtained.

It is of course quite impossible to mention all colors which can be used in this new process. The following are types containing wide range of shades which have given highly satisfactory results: thioindigo scarlet R, pyranthrene, indanthrene blue, thioindigo red B, flavanthrene, anthracene colors *e. g.* the colors described in British Letters Patent No. 7398/01, naturally there are a large number of other organic vat coloring matters which can be used. A simple test will show whether they are suitable or not and I do not limit myself to instances mentioned. Caoutchouc-like materials, balato or gutta percha, may be used.

I claim:—

1. Process for the production of colored caoutchouc materials, which process consists in treating caoutchouc materials with organic vat dyes, and in vulcanizing them after being thus colored by heating with sulfur at the vulcanization temperature, substantially as described.

2. Process for the production of colored caoutchouc-like materials, which process consists in treating caoutchouc-like materials with organic vat dyes, and in vulcanizing them after being thus colored by heating with sulfur at the vulcanization temperature, substantially as described.

3. Process for the production of colored caoutchouc materials, which process consists in treating caoutchouc with a thioindigo dye, and in vulcanizing the same after being thus colored by heating with sulfur at the vulcanizing temperature, substantially as described.

4. Process for the production of colored caoutchouc-like materials, which process consists in treating a caoutchouc-like material with a thioindigo dye, and in vulcanizing the same after being thus colored by heating with sulfur at the vulcanizing temperature, substantially as described.

5. As new products vulcanized caoutchouc substances comprising caoutchouc vulcanized with sulfur and colored with organic vat dyes incorporated therewith before the vulcanization, substantially as described.

6. As new products vulcanized caoutchouc-like substances comprising caoutchouc-like substances vulcanized with sulfur and colored with organic vat dyes incorporated therewith before the vulcanization, substantially as described.

7. As a new product vulcanized rubber comprising rubber vulcanized with sulfur and colored with an organic vat dye incorporated therewith before the vulcanization, substantially as described.

8. As a new product vulcanized rubber comprising rubber vulcanized with sulfur and colored with a thioindigo dye incorporated therewith before the vulcanization, substantially as described.

In testimony whereof I have hereunto set my hand in the presence of two subscribing witnesses.

RUDOLF DITMAR.

Witnesses:
   FRIEDRICH KNOTH,
   OTTO SEATLASHYTIN.